United States Patent [19]
Sato

[11] 3,964,099
[45] June 15, 1976

[54] CASSETTE ADAPTER

[75] Inventor: Masaaki Sato, Hachioji, Japan

[73] Assignee: Olympus Optical Co., Ltd., Tokyo, Japan

[22] Filed: June 5, 1974

[21] Appl. No.: 476,720

[30] Foreign Application Priority Data

June 6, 1973 Japan ............ 48-66863[U]
Sept. 19, 1973 Japan ............ 48-109457[U]
Dec. 29, 1973 Japan ............ 49-3548

[52] U.S. Cl. ............................................. 360/94
[51] Int. Cl.² ................................. G11B 23/04
[58] Field of Search ............... 360/94, 91–92, 360/96; 242/199–200, 55.19 A; 179/100.1 R, 100.1 A

[56] References Cited
UNITED STATES PATENTS

| | | |
|---|---|---|
| 3,531,127 | 9/1970 | Harper .............................. 360/94 |
| 3,632,894 | 1/1972 | Bretschneider et al. .............. 360/94 |
| 3,753,566 | 8/1973 | Yoshida .............................. 360/94 |
| 3,763,330 | 10/1973 | Fulwiler .............................. 360/94 |
| 3,777,073 | 12/1973 | Kokubo .............................. 360/94 |
| 3,800,321 | 3/1974 | Bolick, Jr. .............................. 360/94 |
| 3,821,808 | 6/1974 | Wada et al. .............................. 360/94 |

Primary Examiner—Alfred H. Eddleman
Attorney, Agent, or Firm—Haseltine, Lake & Waters

[57] ABSTRACT

A cassette adapter for a tape recorder which can mount thereon a miniature cassette which is smaller than a standard compact cassette and which comprises mechanisms and an electric circuit which are essential for effecting reproduction of the miniature cassette from the tape recorder.

9 Claims, 26 Drawing Figures

FIG_1
PRIOR ART
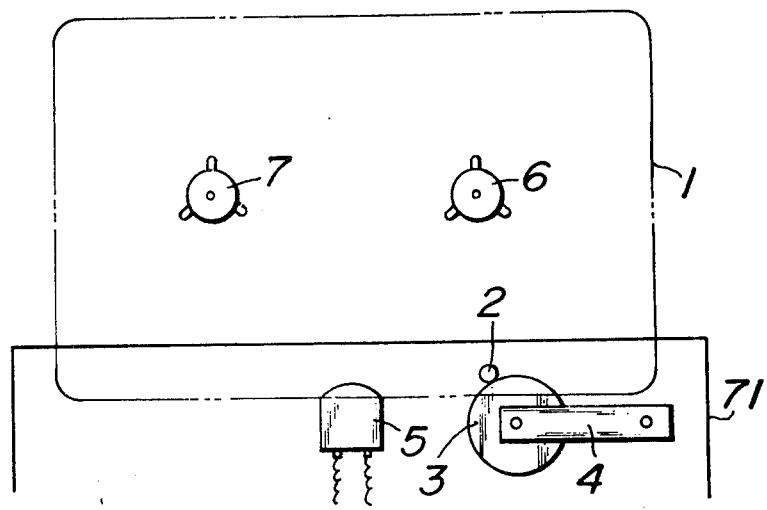
FIG_2a
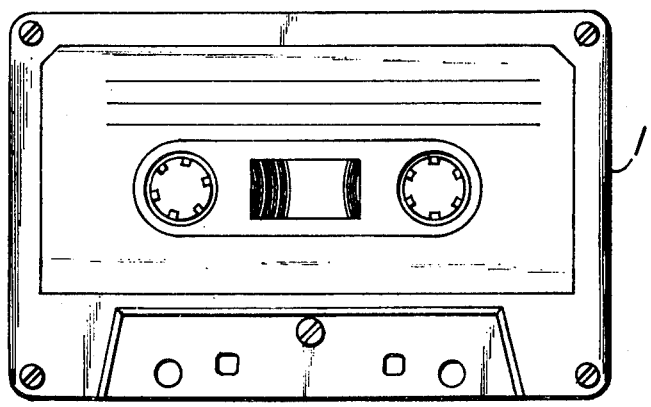
FIG_2b
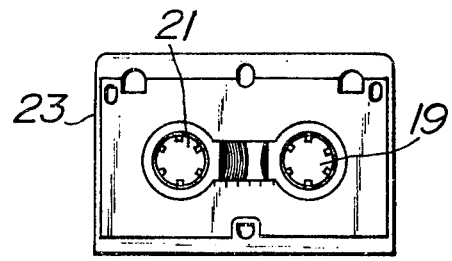

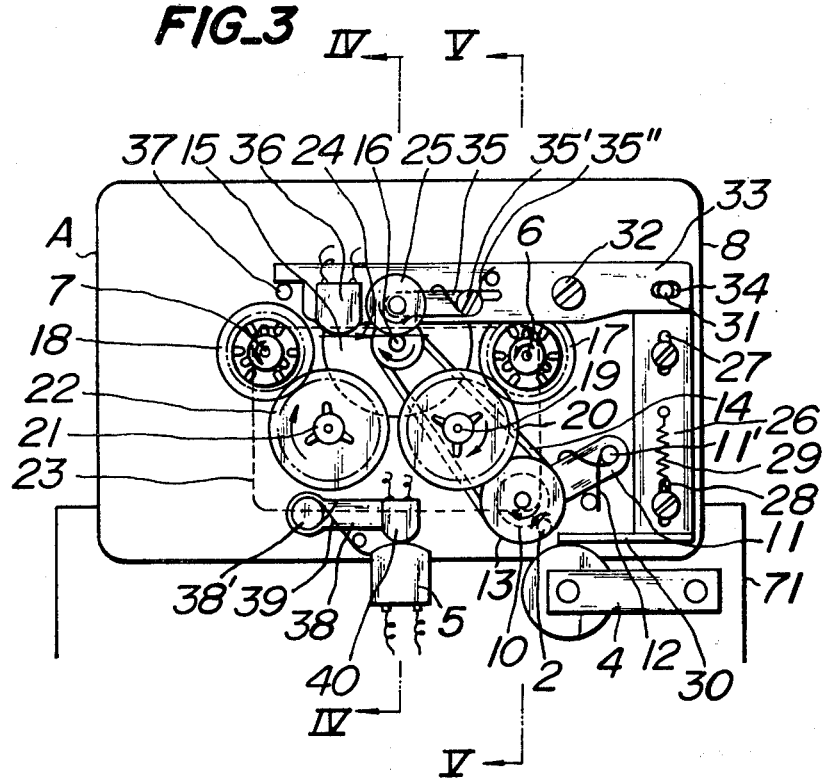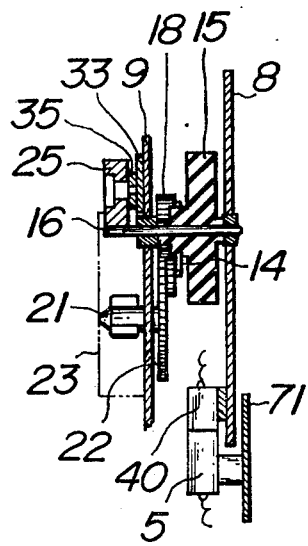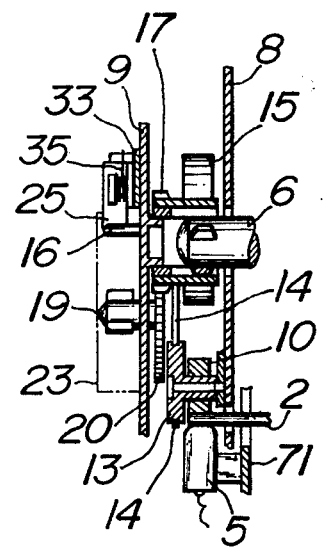

FIG_6
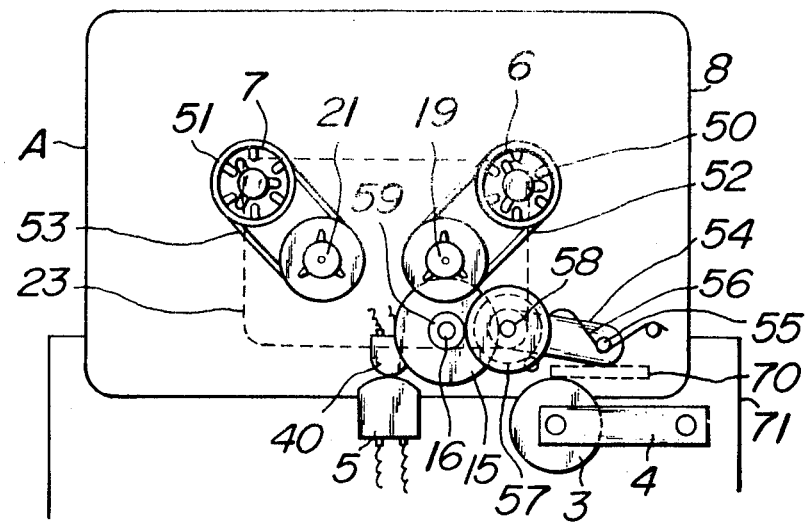
FIG_7
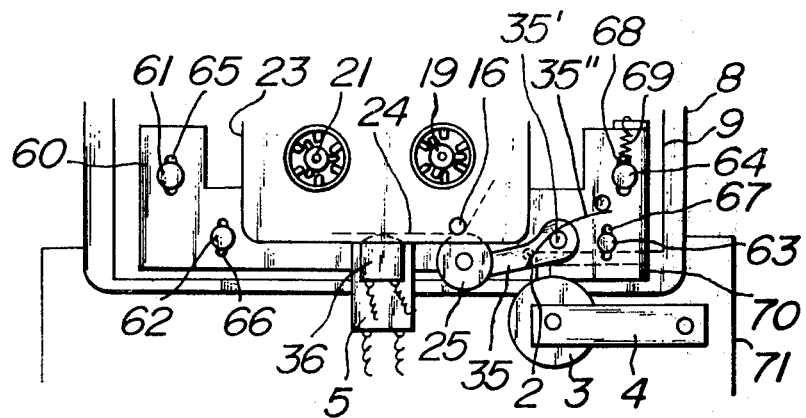

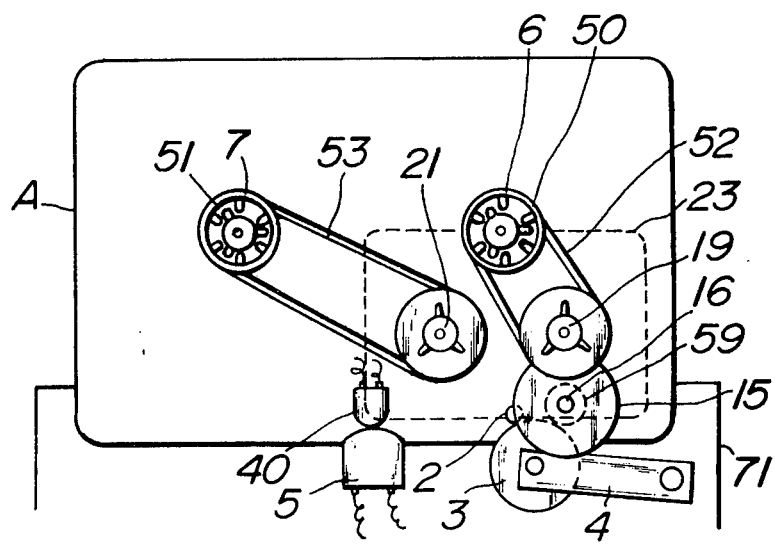
FIG_8
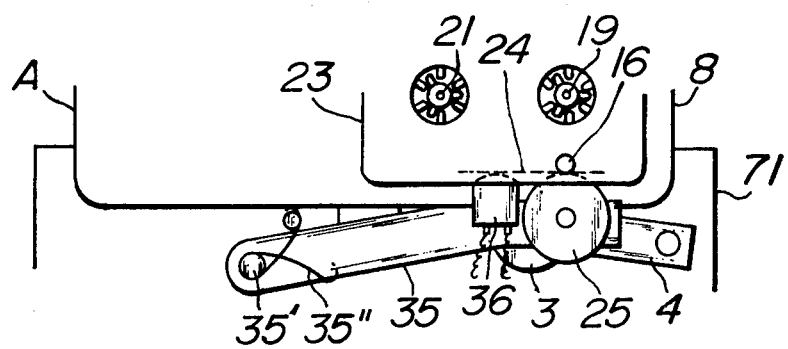
FIG_9

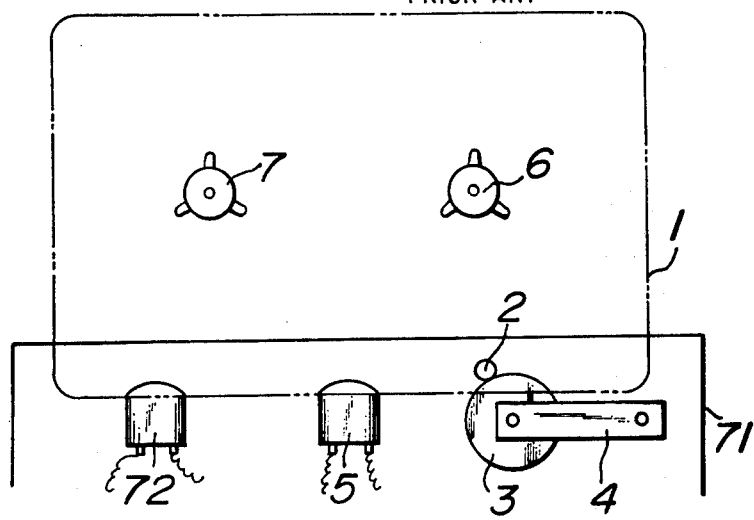
FIG_10
PRIOR ART
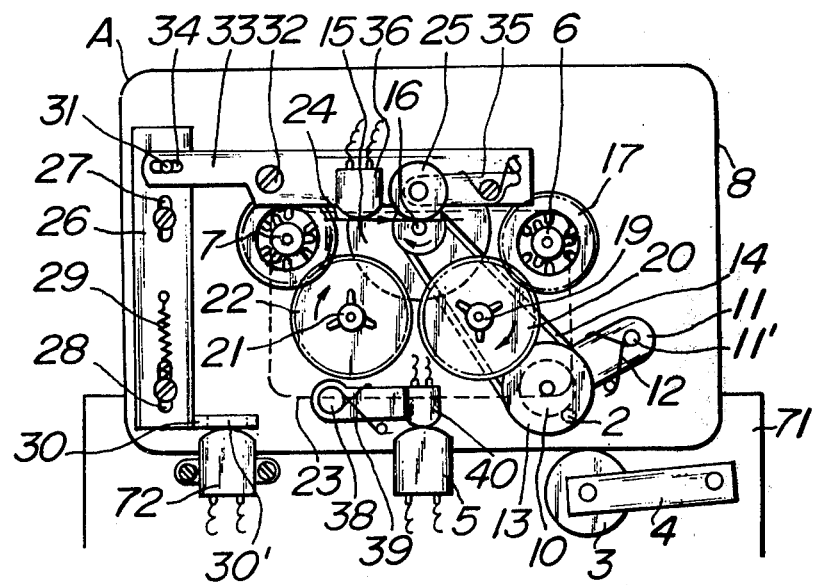
FIG_11

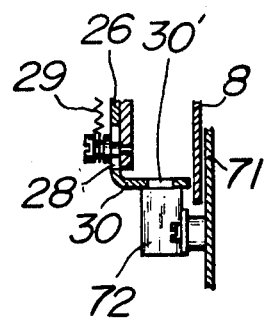
FIG_12
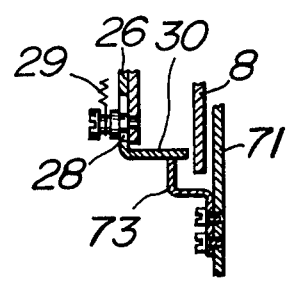
FIG_14
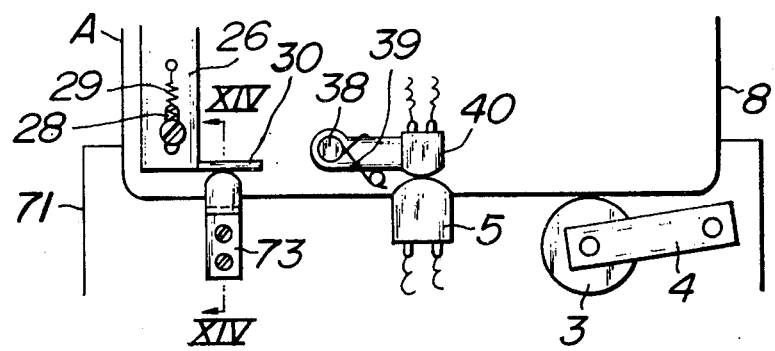
FIG_13

FIG_15
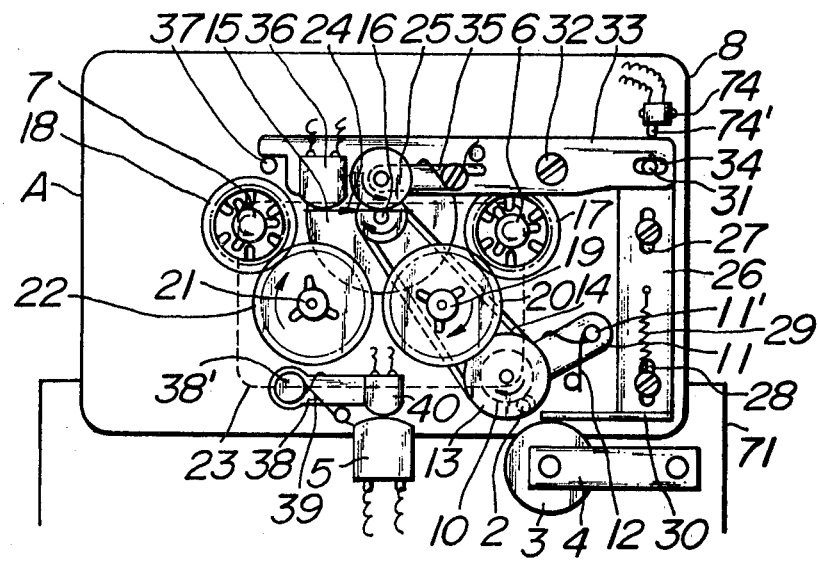
FIG_16
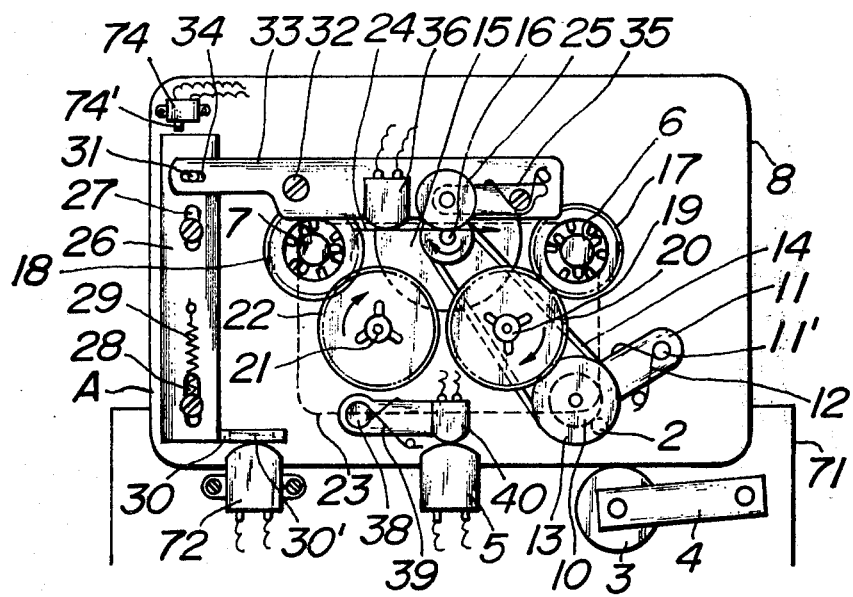

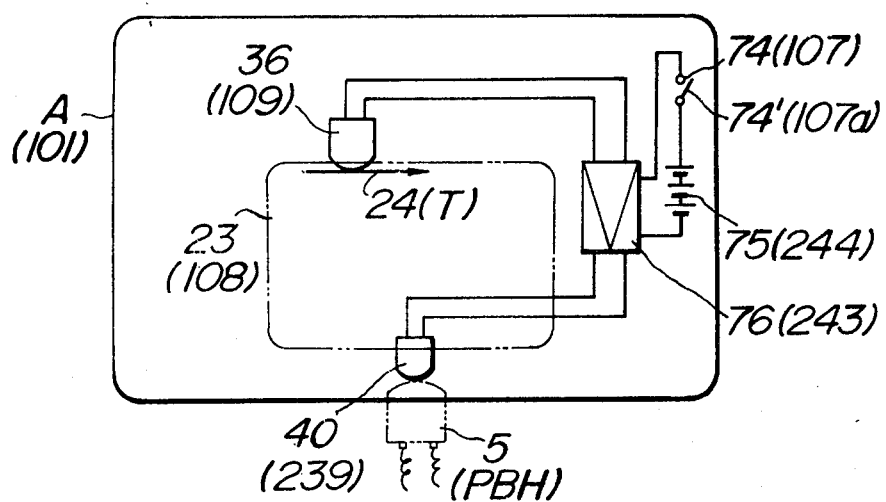
FIG_17

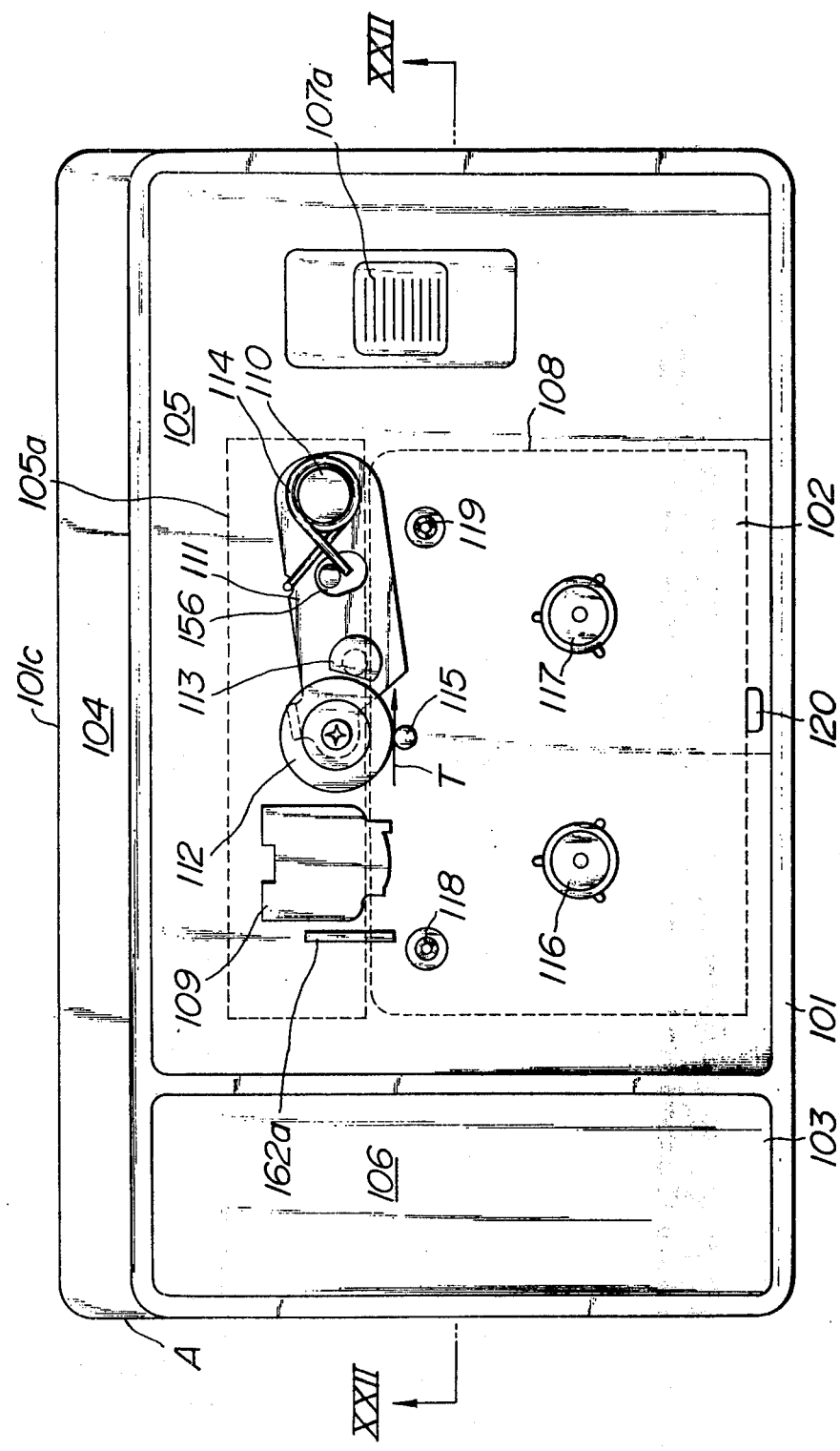
FIG_18

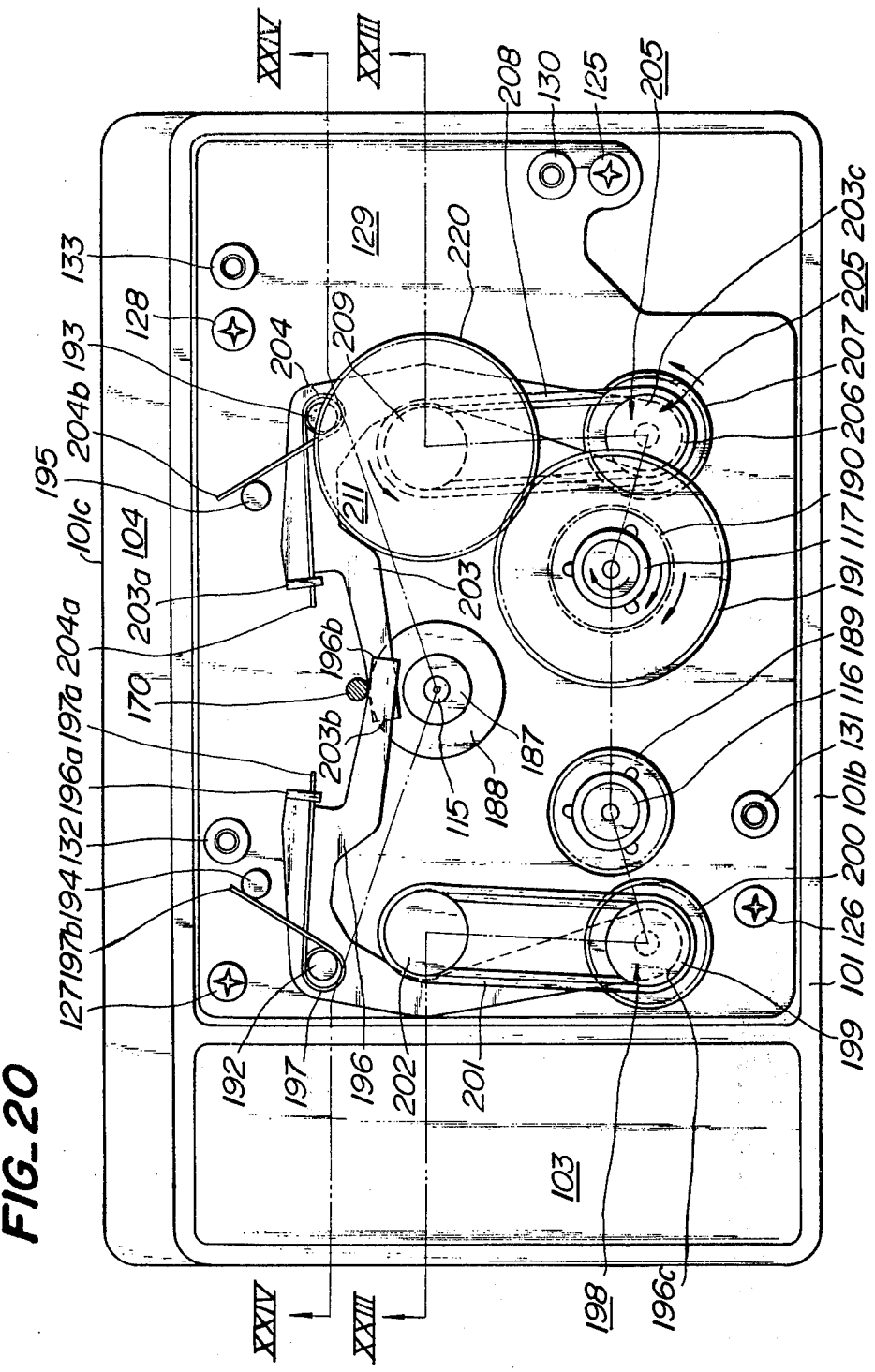

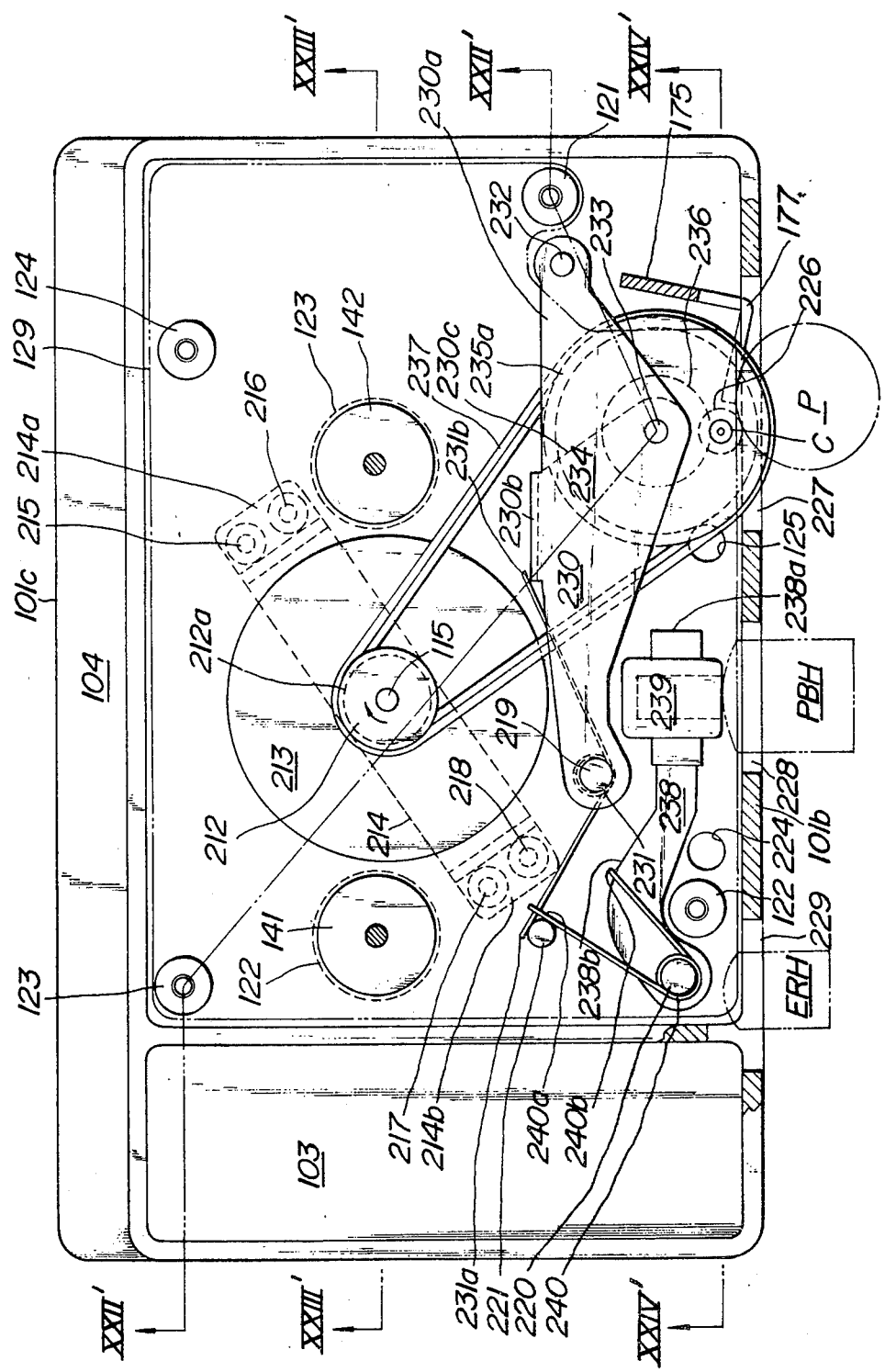

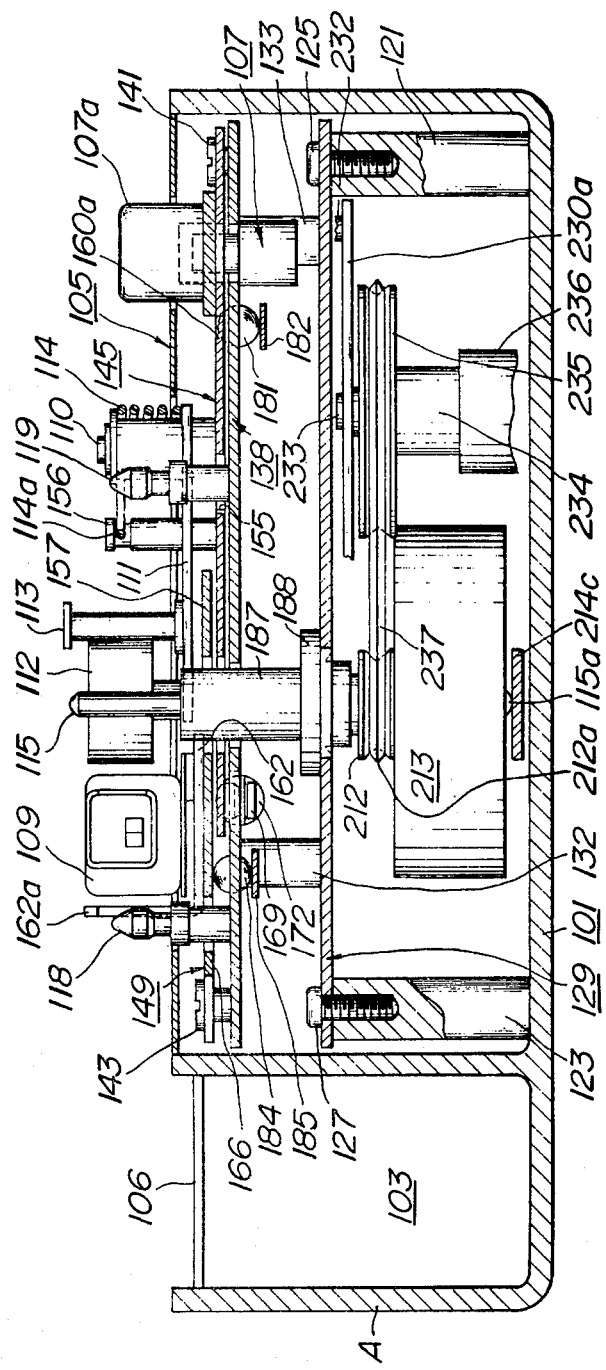
FIG_22

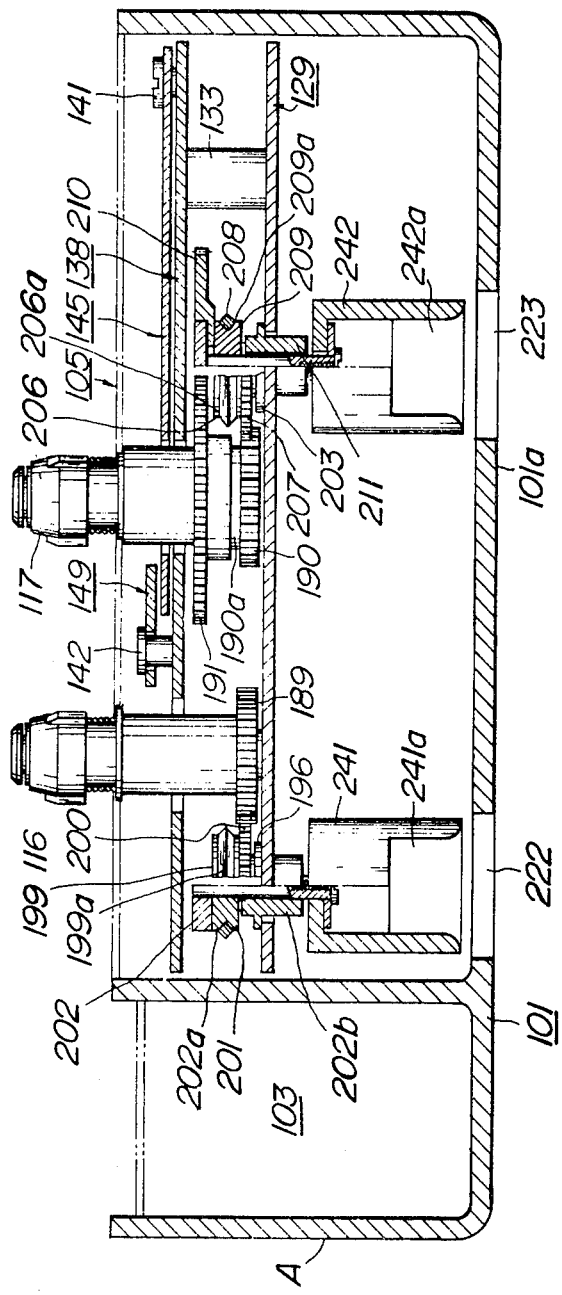

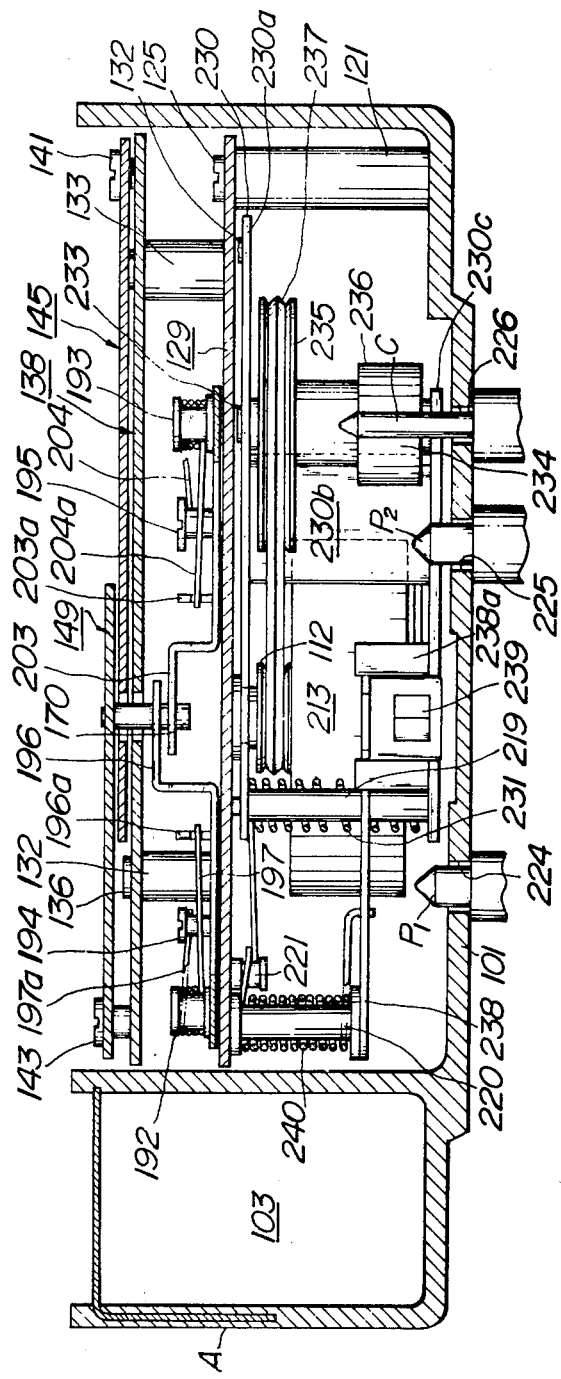
FIG_24

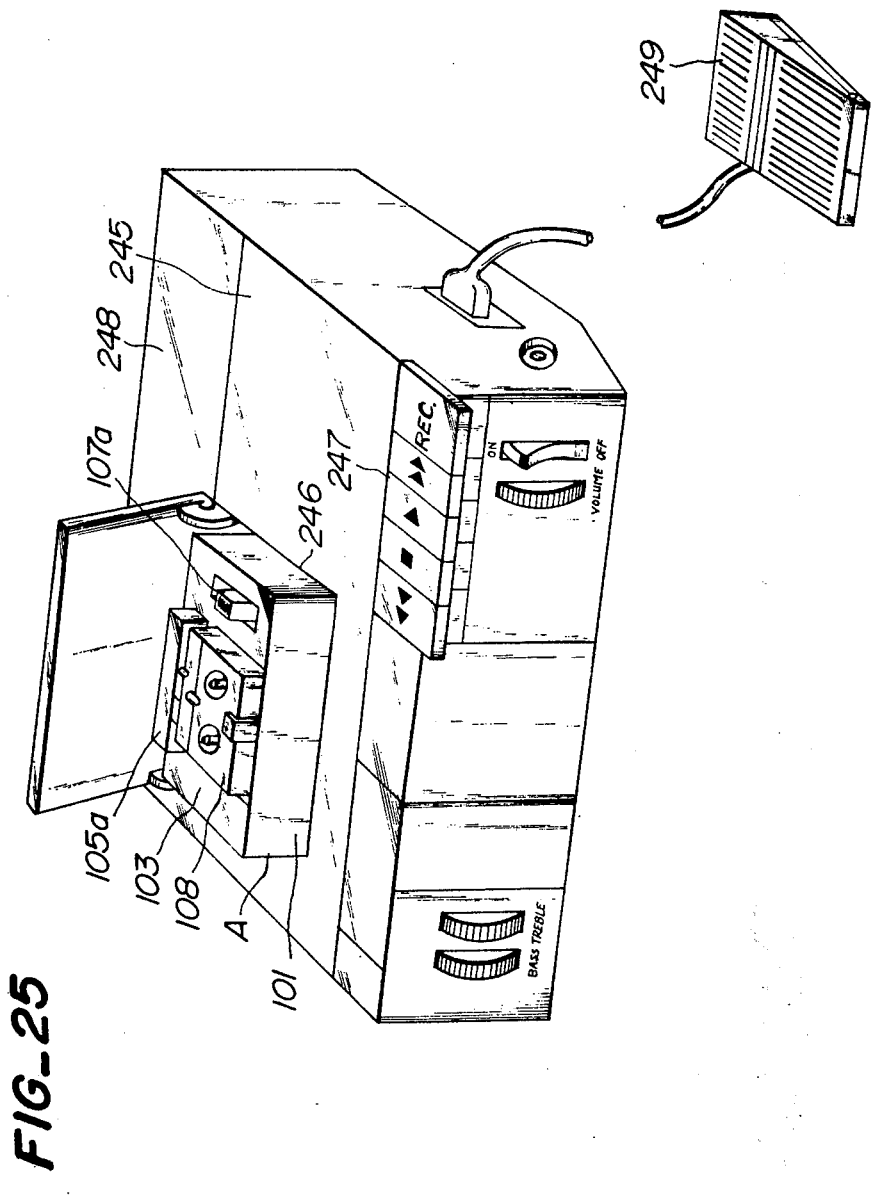

CASSETTE ADAPTER

This invention relates to a cassette adapter for a tape recorder which can mount thereon a miniature cassette which is smaller than a standard compact cassette and which can effect reproduction of the miniature cassette from the tape recorder.

A tape recorder which makes use of a compact cassette has widely been popularized. The standard size of the compact cassette per se, however, causes a limitation in size of the tape recorder, and as a result, it is impossible to manufacture a small tape recorder which can be handled by a user's hand or can be inserted into and removed from a user's pocket. On the other hand, a tape recorder which makes use of a miniature cassette which is smaller than the compact cassette has been developed as a dictating machine or memory machine. The tape recorder using the miniature cassette can be used in the case of recording, but in the case of effecting the reproduction of the miniature cassette it is desirable to use a customary tape recorder having any desired size for the purpose of improving the sound quality thus reproduced and its volume. In this case, the miniature cassette must be mounted on the tape recorder. The customary tape recorder, however, has the disadvantage that the miniature cassette could not be directly mounted thereon. In such a case, it is desirous to provide a cassette adapter which can mount the miniature cassette on the tape recorder.

In addition, if the tape recorder or transcriber is constructed such that play, stop, rewind, cue, fast feed and the like can be effected, the utility of the cassette adapter can significantly be improved.

It is desirous, in general, to construct the cassette adapter such that operating mechanisms and related electric circuits of the tape recorder or transcriber become operative in association with the operation of the keys thereof without effecting any special operations. For this purpose, the cassette adapter may be provided with a member adapted to be interlocked with a pinch roller provided for the tape recorder so as to move the magnetic head and pinch roller provided for the cassette adapter.

The amount of spring force subjected to the pinch roller provided for the tape recorder is designed to be on the order of 250 to 300 g. In addition, the amount of force required for displacing the reproducing head and pinch roller provided for the cassette adapter from their mounted position to their reproduction position by a given distance of 3 to 4 mm is of substantially the same order as 250 to 300 g. In order to increase the distance of displacement of the magnetic head and pinch roller provided for the cassette adapter over the above given distance, it might be considered to increase a lever ratio, i.e. a ratio between displacements at both ends of a lever which is arranged between the pinch roller provided for the tape recorder and the pinch roller provided for the cassette adapter and which can transmit the force applied to the former pinch roller to the latter pinch roller so as to displace the latter pinch roller. In this case, the amount of force required for displacing the pinch roller provided for the cassette adapter is inversely proportional to the lever ratio and hence becomes small. Conversely, if the lever ratio is decreased so as to obtain the amount of force which is sufficient to overcome the given amount of force required for displacing the pinch roller provided for the cassette adapter, the amount of displacement of the pinch roller becomes insufficient. Such contradiction between the distance of displacement of the pinch roller and the amount of force which is sufficient to overcome the given amount of force required for displacing the pinch roller must be solved.

In addition, the cassette adapter for use in tape recorders comprises an amplifier incorporated therein and adapted to be operated by a battery electric source incorporated into the cassette adapter. Provision is made of a power source switch for the purpose of preventing a power source from being consumed. In this case, the power source switch must be made OFF when the cassette adapter is at its inoperative position.

In the cassette adapter for the tape recorder, provision may be made of a lever which can move the reproducting head and pinch roller provided for the cassette adapter in association with the pinch roller provided for the tape recorder. If this lever is rotatably supported by a pivot arranged at the chassis secured to the adapter casing, it is necessary to make this lever normally in contact with the pinch roller provided for the tape recorder, and as a result, this lever projects out of the adapter casing and there is a risk that the lever is changed in shape or subjected to erroneous operation.

An object of the invention is to provide a cassette adapter for a tape recorder which can mount a miniature cassette which is smaller than a compact cassette on a tape recorder so as to effect the reproduction of the miniature cassette from the tape recorder.

Another object of the invention is to provide a cassette adapter for a tape recorder which can move an operating mechanism inclusive of a reproducing head and pinch roller provided for the cassette adapter into its reproduction position from a pinch roller provided for the tape recorder.

A further object of the invention to provide a cassette adapter for a tape recorder which can move an operating mechanism inclusive of a reproducing head and pinch roller provided for the cassette adapter into its reproduction position from a push member secured to a slide plate and inclusive of an erasing head provided for the tape recorder.

A still further object of the invention is to provide a cassette adapter for a tape recorder which can make a battery electric source ON only when an operating mechanism inclusive of a reproducing head and pinch roller provided for the cassette adapter is moved into its reproduction position with the aid of a switch provided for the cassette adapter.

Another object of the invention is to provide a cassette adapter for a tape recorder by which a user can not only manually move an operating mechanism inclusive of a reproducing head and pinch roller provided for the cassette adapter into its reproduction position but also make a battery electric source ON only when the operating mechanism is moved into its reproduction position from a knob provided for the cassette adapter.

Another object of the invention is to provide a cassette adapter for a tape recorder which can obtain sufficient amount of force and sufficient distance of displacement of an operating mechanism inclusive of a reproducing head and pinch roller provided for the cassette adapter.

A further object of the invention is to provide a cassette adapter for a tape recorder which can lock the cassette adapter with the tape recorder even when the tape recorder is at its stop position.

The invention will now be described in greater detail with reference to the accompanying drawings, wherein:

FIG. 1 is a plan view of a conventional tape recorder with a compact cassette mounted thereon;

FIG. 2A is a plan view of the compact cassette shown in FIG. 1;

FIG. 2B is a plan view of a miniature cassette to be reproduced by the tape recorder shown in FIG. 1;

FIG. 3 is a plan view of one embodiment of the cassette adapter according to the invention;

FIG. 4 is a section along line IV—IV in FIG. 3;

FIG. 5 is a section along line V—V in FIG. 3;

FIG. 6 is a plan view of another embodiment of the cassette adapter according to the invention, a subchassis being omitted from the view for clarity;

FIG. 7 shows similarly to FIG. 5 a plan view, the subchassis being shown;

FIG. 8 is a plan view of a further embodiment of the cassette adapter according to the invention, the subchassis being omitted from the view for clarity;

FIG. 9 shows similarly to FIG. 8 a plan view, the miniature cassette with its reproducing head and capstan shaft being shown;

FIG. 10 shows similarly to FIG. 1 a plan view of the customary tape recorder, the erasing head being shown;

FIG. 11 is a plan view of another embodiment of the cassette adapter according to the invention;

FIG. 12 is a section along line XII—XII in FIG. 11;

FIG. 13 is a plan view of yet another embodiment of the cassette adapter according to the invention;

FIG. 14 is a section along line XIV—XIV in FIG. 13;

FIG. 15 shows similarly to FIG. 3 a plan view of the cassette adapter, the battery source switch being shown;

FIG. 16 shows similarly to FIG. 11 a plan view of the cassette adapter, the battery source switch being shown;

FIG. 17 is a simplified illustration of an electrical circuit that may be employed to practice the invention;

FIG. 18 is a plan view of still another embodiment of the cassette adapter according to the invention;

FIG. 20 is a plan view of the cassette adapter shown in FIG. 18 with a subchassis removed from the view for clarity;

FIG. 21 is a plan view of the cassette adapter shown in FIG. 18 seen through a main chassis;

Figure 19:
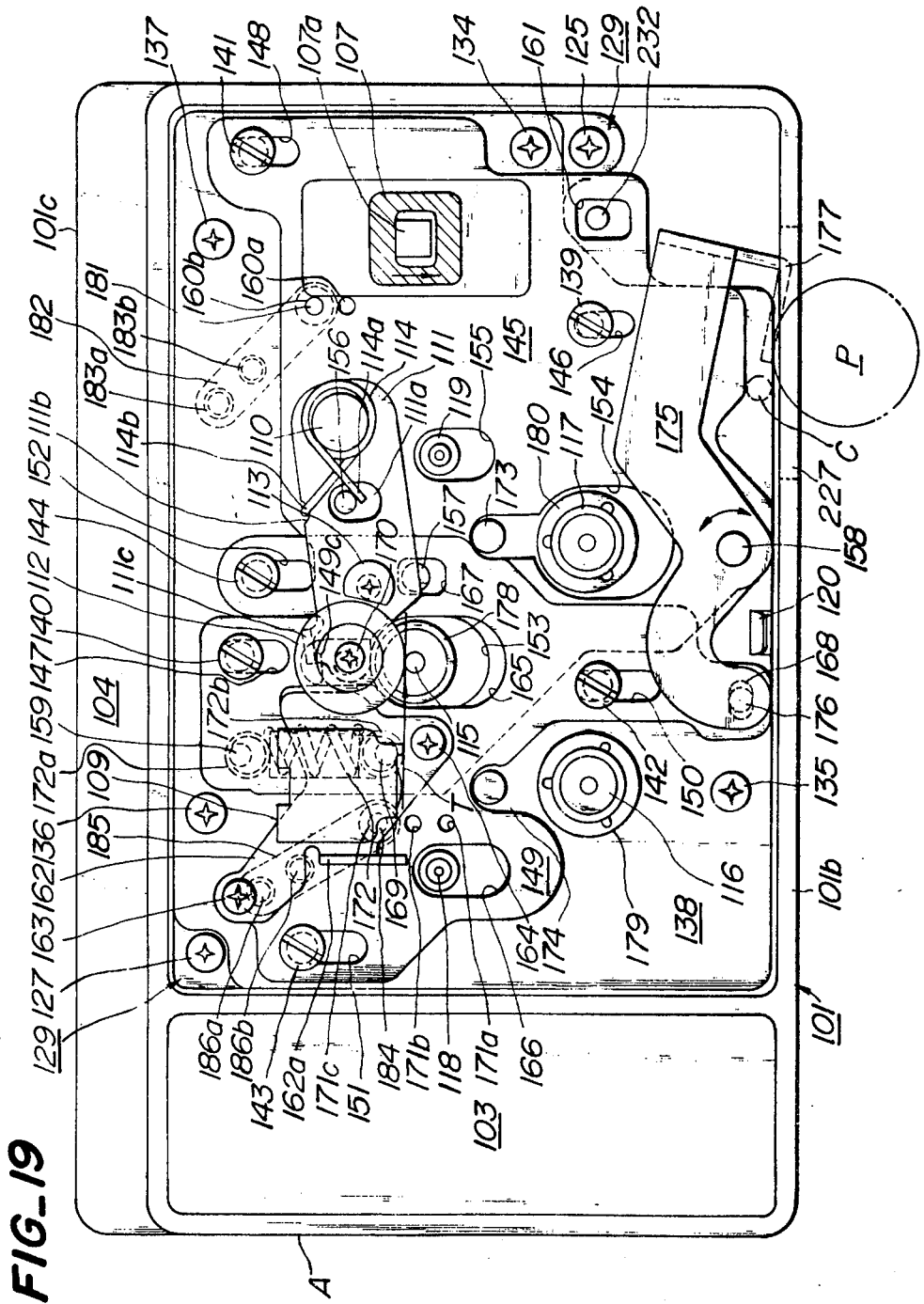
FIG. 19 is a plan view of the cassette adapter shown in FIG. 18 with a cassette receiving plate removed from the view for clarity.

Flg. 22 is a section along line XXII—XXII in FIG. 18 and showing parts arranged above the main chassis and a section along line XXII'—XXII' in FIG. 21 and showing parts arranged below the main chassis;

FIG. 23 is a section along line XXIII—XXIII in FIG. 20 and showing parts arranged above the main chassis and a section along line XXIII'—XXIII' in FIG. 21 and showing parts arranged below the main chassis;

FIG. 24 is a section along line XXIV—XXIV in FIG. 20 and showing parts arranged above the main chassis and a section along line XXIV'—XXIV' in FIG. 21 and showing parts arranged below the main chassis; and FIG. 25 is a perspective view of a tape recorder with the cassette adapter shown in FIG. 18 mounted thereon.

In FIG. 1 is shown a conventional tape recorder in which a compact cassette 1 is shown by dot and dash lines. Reference numeral 2 designates a capstan shaft, 3 a pinch roller, 4 a pinch roller arm, 5 a recording and reproducing magnetic head, 6 a take-up reel, 7 a delivery reel, and 71 a slide plate.

In FIG. 2A is shown the compact cassette 1 shown in FIG. 1 and in FIG. 2B is shown a miniature cassette 23. In FIGS. 3, 4 and 5 is shown one embodiment of the cassette adapter A according to the invention. As shown in FIG. 3, the cassette adapter A according to the invention comprises a main chassis 8 whose base area is substantially equal to that of the customary compact cassette 1 shown in FIG. 2A. The main chassis 8 is mounted on that position of slide plate 71 of a customary tape recorder on which is mounted the compact cassette 1 shown in FIG. 2A.

FIG. 3 shows the cassette adapter A mounted on the slide plate 71 of the tape recorder, a cover and a subchassis 9 being omitted from the view for clarity. A pinch roller 10 is rotatably mounted on an arm 11 pivotally supported by a pivot 11' to the main chassis 8 and caused to be rotated by a spring 12 about the pivot 11' in a counterclockwise direction. Provision is made of pulley 13 adapted to be rotated together with the pinch roller 10 and engaged with an endless belt 14 which is engaged with the shaft portion of a flywheel 15. As shown in FIG. 4, the flywheel 15 is provided at its center with a capstan shaft 16 for a miniature cassette 23 and extending through the main chassis 8 and subchassis 9 and rotatably journaled in the main chassis 8 and the subchassis 9. As shown in FIG. 5, with the take-up reel 6 is fitted a gear 17 and with the delivery reel 7 is fitted a gear 18. The gear 17 threadedly engages with a gear 20 secured to a take-up reel 19 provided for the miniature cassette 23, while the gear 18 threadedly engages with a gear 22 secured to a delivery reel 21 provided for the miniature cassette 23. As shown in FIGS. 2A and 2B the miniature cassette 23 is smaller than the compact cassette 1. A tape 24 of the miniature cassette 23 is delivered from the delivery reel 21 and passes between the capstan shaft 16 and the pinch roller 25 and is wound around the take-up reel 19. The main chassis 8 is provided at its right end with a slide bar 26 adapted to be guided by pin-slot connections 27, 28 and normally biased downwardly as viewed in FIG. 3 by means of a spring 29.

The slide bar 26 is provided at its upper end with a pin 31 which is engaged with a slot 34 provided for the right end of a lever 33 rotatably supported by a pivot 32 secured to the main chassis 8. The lever 33 is provided at its left side with an arm 35 rotatably supporting a pinch roller 25 and with a magnetic head 36 both for the miniature cassette 23. Reference numeral 37 designates a stopper pin projected from the subchassis 9.

As shown in FIG. 19, the output from the magnetic head 36 for the miniature cassette 23 is supplied through an amplifier 76 and a transfer head 40 to the magnetic head 5 provided for the tape recorder, the transfer head 40 being secured to an arm 38 pivotally supported by a pivot 38' secured to the main chassis 8 and biased in a clockwise direction and urged against the magnetic head 5 by means of a spring 39.

When the tape recorder is at its stop position and the slide plate 71 is retracted downwardly, as viewed in FIG. 3, the main chassis 8 of the cassette adapter A according to the invention is mounted on that position of the tape recorder on which is mounted the compact cassette 1. Under such condition, if the slide plate 71 of the tape recorder is moved upwardly as viewed in FIG. 3 and is brought into its reproduction condition as shown in FIG. 3, the magnetic head 5 and the pinch roller 3 are moved upwardly as viewed in FIG. 3 and the magnetic head 5 is made to contact with the transfer head 40 provided for the cassette adapter A and the pinch roller 3 is made to contact with an upright portion 30 secured to the lower end of the slide bar 26 to move the upright portion 30 upwardly against the action of the spring 29. As a result, the lever 33 is rotated about the pivot 32 in a counterclockwise direction to urge the magnetic head 36 provided for the cassette adapter A against the magnetic tape 24 and urge the pinch roller 25 provided for the cassette adapter A against the capstan shaft 16 provided for the cassette adapter A with the tape 24 sandwitched therebetween.

This capstan shaft 16 is driven from the capstan shaft 2 provided for the tape recorder through the pinch roller 10 and endless belt 14. The magnetic tape 24 is driven by the capstan shaft 16 and pinch roller 25 and wound around the take-up reel 19 which is driven from the take-up reel 6 provided for the tape recorder through the gears 17, 20. As seen from the above, the tape recorder is capable of effecting reproduction of the miniature cassette 23.

If the tape recorder is brought into its stop position again, the magnetic head 5 and pinch roller 3 provided for the tape recorder are retracted together with the slide plate 71, and as a result, the magnetic head 36 and pinch roller 25 provided for the cassette adapter are also retracted from the magnetic tape 24 to stop the movement of the magnetic tape 24.

If the tape recorder is brought into its rewind position, the delivery reel 7 provided for the tape recorder causes the delivery reel 21 provided for the cassette adapter to be driven through the gears 18, 22 so as to rewind the magnetic tape 24. If the tape recorder is brought into its fast feed position, the take-up reel 6 provided for the tape recorder causes the take-up reel 19 provided for the cassette adapter to be driven through the gears 17, 20 so as to effect the fast feed operation of the magnetic tape 24.

In the present embodiment, the miniature cassette 23 is mounted on the lower center part of the cassette adapter A and the pinch roller 25 is arranged at the center part of the miniature cassette 23.

In FIGS. 6 and 7 is shown another embodiment of the cassette adapter according to the invention. FIG. 6 is a plan view of the driving mechanism arranged beneath the subchassis 9, while FIG. 6 is a plan view of parts arranged on the subchassis 9. In the present embodiment, the same parts as those in the previous embodiment shown in FIGS. 3 to 5 are denoted by the same reference numerals.

In the present embodiment, to the take-up reel 6 and the delivery reel 7 are secured pulleys 50 and 51, respectively, which are rotatably journaled together with the take-up and delivery reels 6 and 7 in the chassis 8. An endless belt 52 is brought into engagement with the pulley 50 and the take-up reel 19 provided for the miniature cassette 23, while an endless belt 53 is brought into engagement with the pulley 51 and the delivery reel 21 provided for the miniature cassette 23. An arm 54 is rotatably mounted on the chassis 8 and is made rotatable about a pivot 55. The arm 54 is biased by means of a spring 56 so as to be rotated about the pivot 55 in a counterclockwise direction. The arm 54 is provided at its free end with a pinch roller 57 which is urged against the capstan shaft 2 provided for the tape recorder and with a pinch roller 58 adapted to be rotatable together with the pinch roller 57 and urged against a ring 59 secured to the capstan shaft 16 provided for the miniature cassette. As in the previous embodiment, to the capstan shaft 16 is secured the flywheel 15. In addition, the chassis 8 is provided with the transfer head 40 which is in contact with the head 5 provided for the tape recorder as in the previous embodiment.

As shown in FIG. 7, the subchassis 9 is arranged above the chassis 8. Provision is made of a slide lever 60 arranged on the subchassis 9 and guided thereon by means of pin-slot connections 61–65, 62–66, 63–67 and 64–68, respectively. Between the pin 64 and the slide lever 60 is inserted a spring 69 which causes the slide lever 60 to move downwardly as viewed in FIG. 7. The slide lever 60 is provided with the magnetic head 36 and with the lever 35 rotatably mounted thereon and provided with the pinch roller 25. In addition, the slide lever 60 is provided at its right lower edge with an upright plate 70 made in contact with the pinch roller 3 provided for the tape recorder.

If the cassette adapter of the present embodiment is used to effect the reproduction of the miniature cassette 23, the slide plate 71 of the tape recorder is moved upwardly as viewed in FIGS. 6 and 7 to bring the tape recorder into its reproduction position. As a result, the magnetic head 5 and the pinch roller 3 are inserted into the cassette adapter 8 to urge the magnetic head 5 against the transfer head 40 and urge the pinch roller 3 against the upright portion 70 of the slide lever 60. Thus, the slide lever 60 is moved upwardly against the action of the spring 69 to urge the pinch roller 25 through the magnetic tape 24 against the capstan shaft 16 provided for the miniature cassette 23 and also urge the magnetic head 36 against the magnetic tape 24. The capstan shaft 16 is driven from the capstan shaft 2 provided for the tape recorder through the pinch rollers 57, 58 and the ring 59. The take-up reel 19 for the miniature cassette is driven from the take-up reel 6 provided for the tape recorder through an endless belt 52, while the delivery reel 21 is driven from the delivery reel 7 provided for the tape recorder through an endless belt 53.

In the present embodiment, the miniature cassette 23 is mounted at the lower center part of the cassette adapter A and the magnetic head 36 is located at the center of the lower edge of the miniature cassette 23 with the pinch roller 25 arranged at the right side of the magnetic head 36.

In FIGS. 7 and 8 is shown a further embodiment of the cassette adapter according to the invention. In the present embodiment, the miniature cassette 23 is mounted on the right lower corner of the cassette adapter A. In the present embodiment, the pinch roller 3 is in contact with the capstan shaft 2 provided for the tape recorder and also is in contact with the ring 59 secured to the capstan shaft 16 for the miniature cassette and to the capstan shaft 16 is secured the flywheel 15. As in the previous embodiment shown in FIGS. 6 and 7, the take-up reel 19 provided for the miniature cassette 23 is driven from the take-up reel 6 provided for the tape recorder through the endless belt 52, while the delivery reel 21 provided for the miniature cassette is driven from the delivery reel 7 provided for the tape recorder through the endless belt 53.

In the present embodiment, the lever 35 for supporting at its one end the magnetic head 36 and pinch roller 25 is made pivotable about the pivot 35' and biased in a counterclockwise direction by the spring 35''. As in the previous embodiments, the slide plate 71 serves to move the magnetic head 5 and pinch roller 3 provided for the tape recorder so as to insert them into and retract from the cassette adapter A.

In the embodiment shown in FIGS. 10 to 12, the slide bar 28 shown in FIG. 3 is arranged at the left side of the main chassis 8 and the upright portion 30 is provided at that portion thereof which is opposed to the gap of an erasing head 72 with a hole 30' as shown in FIG. 12. The erasing head 72 is moved upwardly and urged against the upright portion 30 when the tape recorder is brought into its reproduction position.

In this case, there is no risk of the gap portion of the erasing head 72 being deteriorated by the upright portion 32 when the tape recorder is brought into its reproduction position and the erasing head 72 is urged against the upright portion 30 since the gap portion of the erasing head 72 are exposed by the presence of the hole 30' provided for the upright portion 30.

In the present embodiment, the erasing head 72 per se is urged against the upright portion 30 of the slide bar 26. It is a matter of course that the same effect can be attained by urging a head supporting seat and the like against the upright portion 30.

In the embodiment shown in FIGS. 13 and 14, the tape recorder is not provided with the erasing head 72 and use is made of an upright member 73 secured to the slide plate 71 in place of the erasing head 72 as shown in FIGS. 13 and 14.

If the tape recorder is brought into its reproduction position and the slide plate 71 is moved upwardly as shown in FIGS. 13 and 14, the projected member 73 is urged against the upright portion 30, thereby bringing the operating mechanism inclusive of the reproducing head 36 and pinch roller 25 into its reproduction position.

As shown in FIG. 17, the output from the magnetic head 36 provided for the cassette adapter A is delivered to an amplifier 76 which is supplied from a battery electric source 75. The output from the amplifier 75 is delivered through the transfer magnetic head 40 to the reproducing head 5 provided for the tape recorder.

In the embodiments shown in FIGS. 15 and 16, a battery electric source switch 74 is arranged above the slide bar 26 and secured to the main chassis 8. A movable contact 74' of the switch 74 is made opposed to the upper end of the slide bar 26 such that switch 74 is made closed by the upward movement of the slide bar 26 and made open by the downward movement of the slide bar 26.

In both the rewinding and fast feeding positions of the tape recorder, the slide bar 26 is not displaced so that the electric source switch 74 remains open.

The use of the electric source switch 74 which cooperates with the slide bar 26 adapted to be displaced upon reproduction or recording of the tape recorder ensures an automatic switching ON of the battery electric source 75 only when the reproduction or recording of the tape recorder is effected and provides the important advantage that there is no risk of the electric power source being consumed by accidental switching ON of the battery electric source 75.

In FIGS. 18 to 25 is shown another embodiment of the cassette adapter according to the invention.

As shown in FIG. 18, the cassette adapter A according to the invention comprises a casing 101, an operating part 102 provided for the casing 101 and including an operating mechanism and an electric circuit and the like incorporated therein, a battery chamber 103 and a stepped portion 104 formed at the rear wall 101c of the casing 101 and having substantially the same thickness as that of a conventional compact cassette. The operating part 102 and the battery chamber 103 are closed by a cassette receiving plate 105 and a battery cover 106, respectively. Out of the cassette receiving plate 105 are projected a knob 107a provided for an electric source switch 107, a reproducing head 109 for detecting a signal such as sound and the like recorded on a miniature cassette 108, a pinch roller 112 provided for a pinch roller arm 11 rotatably supported by a pivot 110, a stopper 113 provided for the miniature cassette 108, a coil spring 114 normally urging the pinch roller arm 111 and hence the pinch roller 112 against the miniature cassette 108, a capstan shaft 115, a delivery reel 116, a take-up reel 117, a pair of pins 118, 119 adapted to determine the position of the cassette 108, a plate spring 120 for urging the miniature cassette 108 against the position determining pins 118, 119 when the miniature cassette 108 is mounted in position, and the like.

In addition, the cassette receiving plate 105 is provided thereon with a head cover 105a which normally covers the reproducing head 109, pivot 110, pinch roller 112 stopper 113 and coil spring 114.

The operating part 102 of the cassette adapter A is provided with a main chassis 129 secured through a plurality of spacers, for example, four spacers 121, 122, 123, 124 (FIGS. 21 and 22) to the casing 101 by means of screws 125, 126, 127, 128 and a subchassis 138 secured through a plurality of spacers, for example, four spacers 130, 131, 132, 133 (FIG. 22) to the main chassis 129 by means of screws 134, 135, 136, 137 (FIG. 24). Between the base of the casing 101 and the main chassis 129 and the subchassis 138 and between the subchassis 138 and the cassette receiving plate 105 are closely packed the operating mechanism and the electric circuit, respectively.

The operating mechanism is constructed and arranged as follows.

In FIG. 19 is shown the cassette adapter at its operating position, i.e. at its play position, with the cassette receiving plate 105 omitted from the view for clarity.

To the subchassis 138 are secured the pair of cassette position determining pins 118, 119. The subchassis 138 is provided with six upwardly projecting guide pins 139, 140, 141, 142, 143, 144. On the subchassis 138 is arranged a manually operated slide plate 145 which is provided with guide grooves 146, 147, 148 corresponding to the guide pins 139, 140, 141, respectively. The manually operated slide plate 145 is slidably arranged on the subchassis 138 in upward and downward direction as viewed in FIG. 19. On the subchassis 138 is arranged a slide plate 149 a part of which is superimposed upon a part of the manually operated slide plate 145 and which is provided with guide grooves 150, 151, 152 corresponding to the guide pins 142, 143, 144, respectively. The slide plate 149 is made slidable on the subchassis 138 in upward and downward directions as viewed in FIG. 19. These guide grooves 150, 151, 152 are made a little longer than the guide grooves 146, 147, 148 provided for the manually operated slide plate 145 for the reasons which will be described later.

To the manually operated slide plate 145 is secured the knob 107a for opening and closing the electric source switche 107 secured to the subchassis 138 and the pivot 110 for pivotably supporting the pinch roller arm 111. In addition, the manually operated slide plate 145 is formed with elongate holes 153, 154, 155 through which are extended the capstan shaft 115, take-up reel 117 and cassette position determining pin 119, respectively.

In case of using cassette adapter A, if the knob 107a is displaced in upward and downward directions as viewed in FIG. 19, it is possible to slidably move the manually operated slide plate 145 in upward and downward directions while guiding it by means of the guide pins 139, 140, 141.

In addition, the manually operated slide plate 145 is provided with upwardly projecting pins 156, 157, upwardly projecting pivot 158, downwardly projecting pin 159, a pair of position determining holes 160a, 160b and a hole 160. The upwardly projecting pin 156 is projected into a hole 111a provided for the pinch roller arm 111 and engages with one end 114a of the coil spring 114 wound around the pivot 110, the other end 114b of the coil spring 114 being engaged with a notch 111b formed at the outer edge of the pinch roller arm 111. As will be described, the pin 157 causes the slide plate 149 to displace in response to the slidable movement of the manually operated slide plate 45. With the position determining holes 160a, 160b are engaged a ball 181 of a clickstop mechanism provided for the subchassis 138. The pivot 158, pin 159 and a hole 161 will be described hereinafter.

To the slide plate 149 is secured a head mounting member 162 by means of a pair of screws 163, 164. On the head mounting member 162 is mounted the magnetic head 109 whose angular position may adjustably be determined in a conventional manner. The head mounting member 162 is provided with an upright portion 162a for guiding a magnetic tape 24. In addition, the slide plate 149 is provided with elongate holes 165 and 166 through which are extended the capstan shaft 115 and cassette position determining pin 118, respectively, holes 167, 168 corresponding to the pin 157 provided for the manually operated slide plate 145, downwardly projecting pins 169, 170 and position determining holes 171a, 171b, 171c. The hole 168 and the pin 170 will be described hereinafter. The pin 169 corresponds to the pin 159 provided for the manually operated slide plate 145 and is capable of upwardly urging the slide plate 149 in relation to the manually operated slide plate 145 by means of a tension coil spring 172 whose one end 172a engages with the pin 159 and whose other end 172b engages with the pin 169. With the position determining holes 171a, 171b are engaged a ball 184 of a clickstop mechanism provided for the subchassis in the same manner as the position determining holes 160a, 160b provided for the manually operated slide plate 145.

As described before, the pinch roller arm 111 for supporting the pinch roller 112 is provided at its left end with a downwardly bent projection 111c for resiliently urging the pinch roller arm 111 against a portion 149c of the slide plate 149.

Reference numerals 173 and 174 designate stoppers provided for the subchassis 38 for limiting the downward movement of the manually operated slide plate 145 and the slide plate 149 as viewed in FIG. 3, respectively.

In the present embodiment, provision is made of a plate shaped level 175 rotatably supported by a pivot 158 provided for the manually operated slide plate 145. The lever 175 is provided at its one end with a downwardly projecting pin 176 which engages with a hole 68 provided for the slide plate 149 and provided at its other end with an L-shaped bent portion 177 which engages with a pinch roller P provided for the tape recorder and shown by dots and dash lines.

Near the pinch roller P provided for the tape recorder is arranged a capstan shaft C provided for the tape recorder and shown by dash lines.

As shown in FIGS. 22 and 23, the above mentioned capstan shaft 115, delivery reel 116 and take-up reel 117 are rotatably mounted on the main chassis 129, respectively, and extended through corresponding holes 178, 179 and 180 provided for the subchassis 138, respectively.

As shown in FIG. 22, the subchassis 138 is provided at its lower surface with clickstop mechanisms which correspond to the position determining holes 160a, 160b and 171a, 171b, 171c provided for the manually operated slide plate 145 and the slide plate 149, respectively. That is, the ball 181 corresponding to the position determining holes 160a, 160b is urged upwardly against the position determining holes 160a, 160b by means of a plate spring 182 which is secured to the lower surface of the subchassis 138 by means of the screws 183a, 183b. Similarly, the ball 184 corresponding to the position determining holes 171a, 171b, 171c is urged upwardly against the position determining holes 171a, 171b, 171c by means of a plate spring 85 which is secured to the lower surface of the subchassis 138 by means of screws 186a, 186b. The position determining holes 160a, 171a correspond to the stop position of the cassette adapter, while the position determining holes 160b, 171c correspond to the play position of the cassette adapter.

In FIG. 20 is shown the cassette adapter A with the subchassis 138 omitted for reason for clarity.

As described before, the capstan shaft 115, delivery reel 116 and take-up reel 117 are rotatably mounted on the main chassis 129. The capstan shaft 115 is vertically supported by a bearing 187 which is secured through a mounting seat 188 to the main chassis 129 (FIG. 6). The capstan shaft 115 is also supported at its lower end by a bearing which will be described later. As shown in FIG. 23, the delivery shaft 116 and the take-up shaft 117 are provided at their lower ends with gears 189, 190 made integral therewith, respectively. The take-up reel 117 is provided with a large gear 191 which is urged through a friction member 190a against the gear 190. The main chassis 129 is also provided with a pair of pins 192, 193 and 194, 195 (FIGS. 4 and 8).

By the pin 192 rotatably supported an inverted L-shaped lever 196. The lever 196 is biased about the pin 192 in a counterclockwise direction by means of a coil spring 97 whose one end 197a engages with an upright portion 196a provided for the lever 196 and whose another end 197b engages with the pin 194. One end 196b of the lever 196 is arranged adjacent the capstan shaft 115 and made resiliently in contact with the pin 170 provided for the lower side of the slide plate 149 as above described. The lever 196 is provided on the upper side of its other end 196c with a rotary body 198. The rotary body 198 consists of an upper pulley 199 having a V-shaped groove 199a (FIG. 23) and a lower gear 200 adapted to be threadedly engaged with the gear 189. The torque delivered from a pulley 202 having a V-shaped groove 202a formed around its outer periphery is transmitted through a square belt 201 made of rubber and the like. The pulley 202 is rotatably journaled by a bearing 202b in the main chassis 129 and directly driven by the delivery shaft provided for the tape recorder as will be described later.

Provision is made of a lever 203 (FIG. 20) which is symmetrical in shape with the lever 196 and is rotatably supported by a pin 193. The lever 203 is biased in a clockwise direction by means of a coil spring 204 whose one end 204a engages with an upright portion 203a of the lever 203 and whose another end 204b engages with the pin 195. One end 196b of the lever 196 is disposed on one end 203b of the lever 203 and is resiliently urged against the pin 170. The lever 203 is provided on the upper side of its another end 203c with a rotary body 205. Similar to the rotary body 98, the rotary body 205 consists of an upper pulley 206 having a V-shaped groove 106a (FIG. 23) and a gear 207 adapted to be threadedly engaged with the gear 190. The torque delivered from a pulley 209 having a V-shaped groove 209a formed around its outer periphery is transmitted through a square belt 208 made of rubber and the like. The pulley 209 is directly driven by the take-up reel provided for the tape recorder as will be described later. The pulley 209 is made integral with a gear 110 threadedly engaged with the large gear 191 to constitute a rotary body 211 as shown in FIGS. 20 and 23.

As shown in FIGS. 20 and 24, both the levers 196, 203 are resiliently urged against the pin 170, and as a result, the upward and downward movements of the slide plate 149 as viewed in FIG. 20 result in a simultaneous following movement of the levers 196, 203 whereby the gears 189 and 200 are threadedly engaged with and separated from each other and also the gears 190 and 207 are threadedly engaged with and separated from each other.

In FIG. 21 is shown the cassette adapter A seen through the main chassis 129.

As shown in FIGS. 21 and 22, provision is made of a pulley 212 having a V-shaped groove 212a around its outer periphery and a flywheel 213 is fitted around that part of the capstan shaft 115 journaled by the vertical bearing 187 which is located above the main chassis 129 in a conventional manner such as press fit or shrinkage fit. The capstan shaft 115 is supported at its lower end 115a by that portion 214c of a supporting plate 214 (FIGS. 21 and 22) which makes contact with the lower end 115a of the capstan shaft 115. The supporting plate 214 is substantially V-shaped in section and has at both ends flanges 214a, 214b which are secured to the lower surface of the main chassis 129 by means of screws 215, 216 and 217, 218. Means of driving the capstan shaft 115 will be described later.

As shown in FIGS. 21 and 24, the main chassis 129 is provided at its lower surface with downwardly projecting shafts 219, 220 and a downwardly projecting pin 221. The casing 101 is provided at its base 101a with holes 222, 223 (FIG. 7) corresponding to the delivery reel and take-up reel (not shown) provided for the tape recorder and with holes 224, 225, 226 (FIG. 8) corresponding to a pair of position determining pins $P_1$, $P_2$ and the capstan shaft C provided for the tape recorder, respectively.

As shown in FIG. 21, the casing 101 is provided at its front wall 101b with openings 227, 228 and 229 corresponding to the pinch roller P, recording and reproducing head PBH and erasing head ERH, respectively.

As shown in FIGS. 21 and 24, provision is made of a lever 230 rotatably supported by the upper and lower ends of the downwardly projecting shaft 219. The lever 230 is composed of a horizontal upper surface portion 230a, an intermediate common connection portion 230b extending substantially perpendicular to the horizontal upper surface portion 230a, and a horizontal lower surface portion 230c. That is, the lever 230 has two horizontal upper and lower surface portions 230a, 230c connected in common to the vertical intermediate common connection portion 230b. A coil spring 231 is arranged between the horizontal upper and lower surface portions 230a and 230c and wound around the downwardly projecting shaft 219, one end of 231a of the coil spring 231 being engaged with the pin 221 (FIG. 21) and the other end 231b being engaged with the intermediate common connection portion 230b, whereby the lever 230 is biased in a clockwise direction about the shaft 219 as viewed in FIG. 21. The lever 230 is provided at the right end of its horizontal upper surface with an upwardly projecting pin 232. As shown in FIG. 19, this pin 232 is arranged in the hole 161 provided for the manually operated slide plate 145. As a result, if the manually operated slide plate 145 is upwardly and downwardly moved as viewed in FIG. 19, the lever 230 becomes rotated about the shaft 219. Through the horizontal upper surface 230a and the horizontal lower surface 230c is extended a pin 233 which rotatably supports a rotary body 234 between the horizontal upper and lower surfaces 230a and 230c. The rotary body 234 is composed of an upper pulley 235 having a V-shaped groove along the outer periphery thereof and a lower friction roller 236 adapted to be engaged with the capstan shaft C provided for the tape recorder. The pulley 235 and the friction roller 236 are made integral with each other. The rotary body 234 is normally so biased upwardly that the rotary body 234 does not collide with the capstan shaft C provided for the tape recorder when the cassette adapter A is mounted on the tape recorder or transcriber which is at its stop position. As shown in FIG. 22, the pulley 235 of the rotary body 234 is connected through a square belt 237 to the pulley 212 of the capstan shaft 115.

As shown in FIGS. 21 and 24, provision is made of a lever 238 rotatably supported by the lower end of the shaft 220. The lever 238 is provided at its free end 238a with a transfer magnetic head 239 adapted to make contact with the reproducing head PBH provided for the tape recorder and transfer the signal such as sound and the like detected by the reproducing magnetic head 109 provided for the cassette adapter.

Around the shaft 220 is wound a coil spring 240 whose one end 240a engages with the pin 221 and another end 240b engages with the inner side edge 238b of the lever 238. The coil spring 240 causes the lever 238 to rotate about the shaft 220 in a clockwise direction as viewed in FIG. 21, that is, toward the reproducing head PBH provided for the tape recorder. The spacer 122 serves as a stopper for limiting the rotation of the lever 238.

As described before, the pulleys 202 and 209 shown in FIGS. 20 and 23 are driven by the delivery reel and take-up reel provided for the tape recorder, respectively. For this purpose, the delivery reel and take-up reel are adapted to be inserted into the holes 222 and 223 provided for the base 101a of the casing 101 shown in FIG. 23. To the pulleys 202 and 209 are secured driving bodies 241 and 242 (FIG. 23), respectively, which drive the pulleys 202 and 209 in response to the rotation of the delivery and take-up reels provided for the tape recorder. The driving bodies 241 and 242 are provided at their lower ends with depressed portions 241a and 242a adapted to be engaged with conventional wing-shaped rotor provided for the outer periphery of the delivery reel and take-up reel provided for the tape recorder, respectively. As shown in FIG. 21, into the opening 229 provided for the front wall 101b of the casing 101 is inserted the erasing head ERH when the tape recorder together with the erasing head ERH and the reproducing head PBH are pushed into the cassette adapter A.

As described before, the cassette adapter A is provided with the reproducing head 109 (FIG. 18) and with the transfer head 239 (FIGS. 21 and 24) for magnetically transferring the signal such as sound and the like detected by the reproducing head 109 to the reproducing head PBH provided for the tape recorder.

As described before with reference to FIG. 17, the reproducing head 109 provided for the cassette adapter A is connected through an amplifier 243 to the transfer head 239. The amplifier 243 is operated by the battery electric source 244 incorporated into the cassette adapter casing 101. Between the battery electric source 244 and the amplifier 243 is connected the electric source switch 107 adapted to be opened and closed by means of the knob 107a secured to the manually operated slide plate 145. As a result, only when the manually operated slide plate 145 is moved, the amplifier 243 becomes operated by the battery electric source 244.

The cassette adapter constructed as above described will operate as follows.

1. In case of mounting the cassette adapter A together with the miniature cassette 108 mounted thereon on the tape recorder as shown in FIGS. 18 and 25.

In the first place, the miniature cassette 108 is held on the cassette receiving plate 105 of the cassette adapter A by means of the position determining pins 118, 119 and the plate spring 120. Then, the cassette adapter A is mounted on that position 246 (FIG. 25) of the tape recorder 245 on which is to be mounted the cassette adapter A.

Then, the knob 107a of the electric source switch 107 provided for the cassette adapter A is downwardly moved to close the electric source switch 107, thereby operating the amplifier 143 by means of the battery electric source 244 incorporated into the adapter casing 101.

If the knob 107a of the electric source switch 107 is downwardly moved, the ball 181 (FIG. 19) of the clickstop mechanism is disengaged from the hole 160a provided for the manually operated slide plate 145 secured to the knob 107a. That is, the manually operated slide plate 145 is slidably moved downwardly along the guide pins 139, 140, 141 provided for the subchassis 138 and engaged with the guide grooves 146, 147, 148, respectively. The downward slidable movement of the manually operated slide plate 145 causes its pin 157 to make contact with the lower end of the hole 167 provided for the slide plate 149, and as a result, the slide plate 149 is also downwardly moved along the guide pins 142, 143, 144 provided for the subchassis 138 and engaged with the guide grooves 150, 151, 152, respectively. Thus, the ball 184 provided for the clickstop mechanism becomes disengaged from the hole 171a. The displacement of the knob 107a and hence the slidable movements of the manually operated plate 145 and slide plate 149 cause the stopper 173 provided for the subchassis 138 to make contact with the upper end of the hole 154 provided for the manually operated slide plate 145 so as to limit its movement. In this position, the balls 181 and 184 provided for the clickstop mechanisms engage with the hole 160b provided for the manually operated slide plate 145 and the hole 171b provided for the slide 149, respectively.

As a result, the pinch roller arm 111 pivotally mounted on the manually operated slide plate 145 is downwardly moved to resiliently urge the pinch roller 112 against the capstan shaft 115. In addition, the upright portion 177 of the lever 175 pivotally mounted by the pivot 158 on the manually operated slide plate 145 is projected outwardly through the opening 227 provided for the front wall 101b of the casing 101. In addition, the downward displacement of the hole 161 provided for the manually operated slide plate 145 causes the spring force of the coil spring 231 to exert through the pin 232, which is projected into the hole 161, upon the lever 230 to rotate it about its shaft 219 in a clockwise direction. As a result, the friction roller 236 provided for the rotary body 234 rotatably mounted on the lever 230 is urged against the capstan shaft C provided for the tape recorder to project the upper pulley 135 into the hole 227 provided for the casing 101, whereby the square belt 237 is subjected to a suitable tension. In this case, the lever 238 for supporting the transfer head 239 provided for the cassette adapter makes contact with the spacer 122.

In addition, the delivery reel and take-up reel (not shown) provided for the tape recorder are projected through the holes 222 and 223 (FIG. 23) provided for the base 101a of the adapter casing 101 into the depressed portions 241a and 242a of the driving bodies 241 and 242 secured to the pulleys 202 and 209, respectively. Thus, the driving bodies 241 and 242 are ready to be rotated by the delivery reel and take-up reel, respectively. But, since the delivery reel and the take-up reel are not yet rotated, the delivery reel 116 and the take-up reel 117 provided for the cassette adapter are not rotated, and as a result, the magnetic tape (not shown) provided for the miniature cassette 108 is not fed.

In this case, the cassette position determining pins $P_1$ and $P_2$ (FIG. 24) provided for the tape recorder are projected into the holes 224 and 225 provided for the base 101a of the adapter casing 101, respectively.

2. In case of reproducing the miniature cassette 108 through the cassette adapter A by means of the tape recorder 145 (FIG. 25).

The cassette adapter A is mounted on the tape recorder 245 and an operating button 247 is brought into its reproduction position. As a result, the take-up reel (not shown) and the capstan shaft C (FIG. 5) provided for the tape recorder begin to rotate. In addition, the pinch roller P (FIG. 21), magnetic heads PBH, ERH are pushed toward the front wall 101b of the adapter casing 101. The reproducing head PBH is inserted into the opening 228 of the front wall 101b of the adapter casing 101 and is resiliently urged against the transfer head 239 secured to the lever 228 to cause it to rotate about its pivot 220 in a counterclockwise direction to transfer the signal such as sound and the like from the reproducing head PBH to the transfer head 239. The erasing head ERH is inserted into the opening 229, but the cassette adapter used exclusively for the reproduction does not perform the erasing action.

As described before, if the pinch roller P is pushed toward the front wall 101b of the adapter casing 101, the pinch roller P is urged against the upright portion 177 of the lever 175, and as a result, the lever 175 becomes rotated about its pivot 158 in a counterclockwise direction. Thus, the lever 175 causes the slide plate 149 to move further downwardly through the pin-hole connection 176, 168 relative to the manually operated slide plate 145 against the action of the tension spring 172 inserted between the pin 159 provided for the manually operated slide plate 145 and the pin 169 provided for the slide plate 149. This downward movement of the slide plate 149 is limited by the stopper 174 provided for the subchassis 138. In this case, the ball 184 provided for the clickstop mechanism is removed out of the hole 171b and becomes engaged with the hole 171c.

The displacement of the slide plate 149 relative to the manually operated slide plate 145 causes the reproducing head 109 to move downwardly by 3 to 4 mm, for example, and make contact with the magnetic tape T provided for the miniature cassette. At the same time, the downwardly projecting pin 170 provided for the slide plate 149 is downwardly displaced as viewed in FIG. 20 so that the free end 196b of the lever 196 rotatably supported by the main chassis 129 is downwardly pushed to rotate the lever 196 about its pivot 192 in a clockwise direction against the action of the coil spring 197 to disengage the gear 200 provided for the rotary body 198 and mounted at another free end 196c of the lever 196 from the gear 189 provided for the delivery reel 116. In addition, the free end 203b of the lever 203 is also pushed downwardly to rotate the lever 203 about its pivot 193 in a counterclockwise direction and disengage the gear 207 provided for the rotary body 204 mounted on another free end 203c of the lever 203 from the gear 190 provided for the take-up reel 117 provided for the cassette adapter.

At this instant, the delivery reel, take-up reel and capstan shaft C provided for the tape recorder are rotated, so that the driving mechanism provided for the cassette adapter is driven.

That is, the torque of the capstan shaft C (FIG. 21) provided for the tape recorder is transmitted through the friction roller 236 provided for the rotary body 234, pulley 235, square belt 237 and pulley 212 to the capstan shaft 115 provided for the cassette adapter A.

In addition, the torque of the take-up reel provided for the tape recorder is transmitted through the driving body 242 (FIG. 23), gear 210 provided for the rotary body 211 made integral with the driving body 242, gear 191 and friction member 190a to the take-up reel 117 provided for the cassette adapter A so as to rotate it. In this case, the delivery reel 116 provided for the cassette adapter A is not driven.

As a result, the magnetic tape T provided for the miniature cassette 8 is fed at a given peripheral speed by means of the capstan shaft 115 and is wound aroung the take-up reel 117. In addition, the take-up reel 117 is driven through the friction member 190a (FIG. 23) from the take-up reel provided for the tape recorder so that the friction member 190a prevents the winding torque of the take-up reel 117 from becoming excessively large.

The signal such as sound and the like recorded on the magnetic tape T is detected by the reproducing head 109 (FIG. 17) and converted into an electrical signal which is amplified by the amplifier 243 to a given level and then transmitted through the transfer head 239 to the reproducing head PBH provided for the tape recorder. The output from the reproducing head PBH is amplified by a power amplifier incorporated into the tape recorder 245 (FIG. 25) to an extend which is sufficient to operate a speaker 248. Provision may be made of a foot switch 249 for the purpose of effecting play, stop, review, cue, fast feed, rewinding and the like.

3. In case of stopping the magnetic tape T provided for the miniature cassette A and fed under reproduction condition.

The operating button 247 (FIG. 25) provided for the tape recorder 245 on which is mounted the cassette adapter A is brought into its stop position. As a result, the take-up reel and capstan shaft C provided for the tape recorder become stopped. In addition, the pinch roller P and magnetic heads PBH, ERH are retracted from the front wall 101b of the adapter casing 101.

As a result, the cassette adapter A is returned from the reproduction condition (2) to the condition (1).

That is, the lever 238 for supporting the transfer head 239 (FIG. 21) is rotated about its pivot 220 in a clockwise direction by the action of the coil spring 240 until the lever 238 is urged against the spacer 122.

In addition, the lever 175 (FIG. 19) provided at one of its free ends with the upright portion 177 opposed to the pinch roller P provided for the tape recorder is subjected to the action of the coil spring 172 inserted between the manually operated slide plate 145 and the slide plate 149 and is rotated about its pivot 158 provided for the manually operated slide plate 145 in a clockwise direction. As a result, the upright portion 177 of the lever 175 is projected outwardly through the opening 227 provided for the front wall 101b of the adapter casing 101 and comes into contact with the pinch roller P which has been retracted into the tape recorder. The slide plate 145 interlocked with the lever 175 is moved upwardly by a distance corresponding to the clockwise rotation of the lever 175. In this case, the manually operated slide plate 145 is not moved owing to the presence of the loose engagement between the hole 167 provided for the slide plate 149 and the pin 157 provided for the manually operated slide plate 145. If the slide plate 149 is moved upwardly, the downwardly projected pin 170 secured to the slide plate 149 and resiliently urged against the fre ends 196b and 203b of the pair of levers 196 and 203, respectively, is returned upwardly, and as a result, the lever 196 is rotated about its pivot 192 in the counterclockwise direction by the action of the coil spring 197 while the lever 203 is rotated about its pivot 193 in the clockwise direction by the action of the coil spring 204. Thus, the gear 200 of the rotary body 198 rotatably mounted on the lever 196 becomes threadedly engaged with the gear 189 of the delivery shaft 116, while the gear 207 of the rotary body 205 rotatably mounted on the lever 203 becomes threadedly engaged with the gear 190 of the take-up reel 117. The gear 191 of the take-up reel 117 is normally threadedly engaged with the gear 210.

The pulley 235 provided for the rotary body 234 and provided with the friction roller 236 resiliently urged against the capstan shaft C provided for the tape recorder is arranged such that the pulley 235 is locally projected out of the front wall 101b of the adapter casing 101. In addition, the electric source switche 107 is held open so that the amplifier 243 is not operated.

The tape recorder can be turned over from this stop position to any position selected from the reproduction, fast feed and rewinding positions.

The cassette adapter A could not be detached from the tape recorder 145 owing to the following reasons.

4. In case of effecting fast feed or rewinding of the magnetic tape T provided for the cassette adapter A and held at its stop condition.

The operating button 247 provided for the tape recorder 245 including the cassette adapter A mounted thereon is brought into its fast feed position or its rewinding position. As a result, the take-up reel provided for the tape recorder is rotated at a high speed in a normal direction or the delivery reel is rotated at a high speed in the opposite direction.

If the take-up reel provided for the tape recorder is rotated at the high speed in the normal direction, the driving body 242 is driven through its depressed portion 242a by the take-up reel. The rotation of the driving body 242 is transmitted through the gear 210 (FIG. 23) provided for the rotary body 211, gear 191 and friction member 190a to the take-up reel 117. In case of the fast feed operation, the rotation of the driving body 242 is transmitted to the take-up reel 117 not only through the above described gears but also through the pulley 209 of the rotary body 211, square belt 208, pulley 206 of the rotary body 205, gear 207 to the gear 190. As a result, the take-up reel 117 is rotated at the high speed so as to effect the fast feed of the magnetic tape T of the miniature cassette 108.

In the case of effecting the rewinding in which the delivery shaft provided for the tape recorder is rotated at a high speed in the opposite direction, the driving body 241 is driven through the depressed portion 241a engaged with the delivery reel provided for the tape recorder.

The driving body 241 is not connected to the delivery reel 116 provided for the cassette adapter at the time of the reproduction operation, but is connected thereto at the time of the rewinding operation. In the latter case, the rotation of the driving body 241 is transmitted through the pulley 202, square belt 201, pulley 199 of the rotary body, gear 200 and gear 189 to the delivery reel 116. As a result, the delivery reel 116 is rotated at the high speed in the opposite direction so as to rewind the magnetic tape T of the miniature cassette 108.

At any rate, the take-up reel 117 is directly connected to the take-up reel provided for the tape recorder at the time of the fast feed operation and the delivery reel 116 is directly connected to the delivery reel provided for the tape recorder at the time of the rewinding, so that the mere operation of operation button 247 provided for the tape recorder 245 to the fast feed position or to the rewinding position makes it possible to effect the fast feed operation of the magnetic tape T of the miniature cassette 108.

5. In the case of removing the cassette adapter A under stopped condition from the tape recorder 245.

In the cassette adapter A under its stopped condition, the upright portion 177 (FIGS. 19 and 21) of the lever 175 and the pulley 235 of the rotary body 234 are projected outwardly through the opening 227 formed in the front wall 101b of the adapter casing 101. In addition, the electric source switch 107 is closed. As a result, the cassette adapter A under its stopped condition could not be removed from the tape recorder 245.

In order to remove the cassette adapter A from the tape recorder 245, it is necessary to upwardly push back the knob 107a of the electric source switch 107.

If the knob 107a of the electric source switch 107 is upwardly pushed back, the electric source switch 107 becomes opened to render the amplifier 143 inoperative. In addition, the manually operated slide plate 145 to which is secured the knob 107a is upwardly displaced along the pins 139, 140, 141 secured to the subchassis 138. As a result, the pin 157 of the manually operated plate 145 comes into contact with the upper end of the hole 167 formed in the slide plate 149 so that the slide plate 149 is also brought back upwardly along the pins 142, 143, 144 provided for the subchassis 138.

The above described displacements of the manually operated slide plate 145 and the slide plate 149 cause the lever 175 which makes contact with the pinch roller P provided for the tape recorder to move upwardly to retract the upright portion 177 through the opening 227 into the adapter casing 101.

In addition, the lever 230 including the pin 232 located in the hole 161 formed in the manually operated slide plate 146 is rotated about the pivot 219 in a counter-clockwise direction against the spring action of the coil spring 231, and as a result, the friction roller 236 held in contact with the capstan shaft C provided for the tape recorder is rotated in a counterclockwise direction so as to retract the pulley 235 through the opening 127 into the adapter casing 101.

In addition, the upward displacement of the manually operated slide plate 145 causes the pivot 110 of the pinch roller arm 111 to move upwardly so as to upwardly move the pinch roller 112 which is then retracted into the head cover 105a (FIGS. 18 and 25). In addition, the upward displacement of the slide plate 149 results in an upward displacement of the reproducing head 109 which is also retracted into the head cover 150a.

As a result, it is possible to remove the cassette adapter from the tape recorder 245 and then remove the miniature cassette 108 from the cassette adapter A.

As stated hereinbefore, the cassette adapter A according to the invention has a number of advantages.

1. In the first place, in case of moving the reproducing head 109 provided for the cassette adapter A from one position where the cassette 108 can be mounted on the adapter 1 to another position where the reproduction can be effected, a user can manually move the knob 107a of the electric source switch 107 and then can push the operating button 247 of the tape recorder 245 on which is mounted the cassette adapter A so as to automatically effect the reproduction of the cassette 108. This construction makes it possible to shorten the distance for the movement of the reproducing head 109 and pinch roller 112 provided for the cassette adapter A which movement must be effected by the movement of the pinch roller P provided for the tape recorder. The above described successive manual operations eliminate a difficult problem that the urging action of the pinch roller P provided for the tape recorder is insufficient to move the reproducing head 109 and pinch roller 112 provided for the cassette adapter.

2. Secondly, since the knob 107a of the electric source switch 107 provided for the cassette adapter A is secured to the manually operated slide plate 145 adapted to be displaced when the knob 107a is moved, the battery electric source 244 of the amplifier 243 provided for the cassette adapter A can be made ON or OFF when the knob 107a is moved. That is, if the knob 107a is brought into its upward inoperative position, the electric source 244 becomes OFF. At this inoperative position of the knob 107a, the miniature cassette 108 can be mounted on and removed from the cassette adapter A. As a result, when the cassette adapter A is not used, the battery electric source 244 is made OFF so that it is possible to prevent useless consumption of the battery electric source 144 incorporated into the cassette adapter 1. In addition, the electrical circuit and the operating mechanism can simultaneously be changed over by one operation of the knob 107a, thereby preventing an erroneous operation.

3. Third, the lever 175 for moving the reproducing head 109 provided for the cassette adapter A in association with the pinch roller P provided for the tape recorder is rotatably mounted about the pivot 158 secured to the manually operated slide plate 145. This construction renders it possible to project the lever 175 out of the adapter casing A into a desired place only when the lever 175 is operated, thereby preventing the erroneous operation, change in shape and the like of the lever 175.

4. Fourth, at the time of reproduction only the take-up reel 117 provided for the cassette adapter A is driven through the friction member 190a by means of the take-up reel provided for the tape recorder so that there is no risk of the magnetic tape T being subjected to excessively large tension. In addition, in case of effecting the fast feed or the rewinding, the take-up reel 117 or delivery reel 116 provided for the cassette adapter A is directly driven from the take-up reel or delivery reel provided for the tape recorder so that a high transmission efficiency can be obtained.

5. Fifth, the friction roller 236 urged against the capstan shaft C provided for the tape recorder and for driving the capstan shaft 115 provided for the cassette adapter A is made movable into and out of the cassette adapter A in association with the movement of the manually operated slide plate 145. This construction permits the friction roller 236 to retract into a position such that the friction roller 236 does not collide with the capstam shaft C provided for the tape recorder when the cassette adapter A is mounted on the tape recorder 245 and provides the important advantage that the cassette adapter A can easily be mounted on the tape recorder 145 and that the friction roller 236 is reliably urged against the capstan shaft C provided for the tape recorder 245 at the time of reproduction of the miniature cassette 108.

It may be clear that the invention is not restricted to the embodiment of the cassette adapter A used exclusively for the reproduction of the miniature cassette 108 and that variations are easily possible for effecting both the recording and reproduction of the miniature cassette 108.

What is claimed is:

1. A cassette adapter for tape recorders using relatively large conventional cassettes, the tape recorder including a first capstan shaft with a first pinch roller as well as first delivery and take-up reels, the adapter being substantially equal in size to the large cassettes and being capable of mounting thereon relatively small cassettes, to be played on the tape recorder through the intermediary of the adapter, the small cassette including second delivery and take-up reels, the adapter comprising: a second capstan shaft, a second pinch roller associated with the second capstan shaft, a first power-transmission mechanism for driving the second capstan shaft from said first capstan shaft; a second power-transmission mechanism for selectively driving said second delivery and take-up reels from at least one of said first delivery and take-up reels; and means for moving an operating mechanism into a condition for reproducing recording on the small cassette, said operating mechanism including a first magnetic head for the adapter and said second pinch roller, by means of a reproduction operating member on the tape recorder.

2. The cassette adapter as defined in claim 1, further comprising an amplifier connected to said first magnetic head, a transfer head connected to said amplifier and to a second magnetic head for the tape recorder, said amplifier being operated through a switch from an electric source.

3. The cassette adapter as defined in claim 1, wherein said reproduction operating member is said first pinch roller, rotatably supported by a slide plate of the tape recorder.

4. The cassette adapter as defined in claim 1, wherein said reproduction operating member is an erasing head secured to a slide plate of the tape recorder.

5. The cassette adapter as defined in claim 1, wherein said reproduction operating member is an upright member secured to a slide plate of the tape recorder.

6. The cassette adapter as defined in claim 2, wherein said means for moving an operating mechanism is interlocked with said switch, and includes said first magnetic head and said second pinch roller, for actuating said reproduction operating member.

7. The cassette adapter as defined in claim 1, wherein said reproduction operating member includes a first, manually operable slide plate and a second slide plate loosely interlocked with said first slide plate, a third magnetic head being mounted thereon and effecting at least reproduction, and further comprising a lever inserted between said second slide plate and said first pinch roller, for slidably moving one of said slide plates relative to the other.

8. The cassette adapter as defined in claim 7, wherein said first slide plate includes a knob for opening and closing an electric-source switch in the adapter.

9. The cassette adapter as defined in claim 7, further comprising a pivot secured to said first slide plate for pivotally supporting said lever.

* * * * *